United States Patent
Leutgeb et al.

(10) Patent No.: US 8,905,309 B2
(45) Date of Patent: Dec. 9, 2014

(54) READER APPLICATION DEVICE

(75) Inventors: Thomas Leutgeb, Lieboch (AT); Josef Haid, Graz (AT)

(73) Assignee: Infineon Technologies AG, Neubiberg (DE)

( * ) Notice: Subject to any disclaimer, the term of this patent is extended or adjusted under 35 U.S.C. 154(b) by 263 days.

(21) Appl. No.: 12/045,320

(22) Filed: Mar. 10, 2008

(65) Prior Publication Data

US 2009/0224043 A1  Sep. 10, 2009

(51) Int. Cl.
G06K 7/00  (2006.01)

(52) U.S. Cl.
CPC .................... G06K 7/0008 (2013.01)
USPC ............ 235/439; 235/449; 235/450; 235/451

(58) Field of Classification Search
USPC .......... 235/487, 492, 435, 439, 449, 450, 451
See application file for complete search history.

(56) References Cited

U.S. PATENT DOCUMENTS

| | | | | |
|---|---|---|---|---|
| 5,859,414 | A * | 1/1999 | Grimes et al. ................ | 235/383 |
| 6,769,609 | B2 * | 8/2004 | Ono et al. ..................... | 235/380 |
| 7,128,274 | B2 * | 10/2006 | Kelley et al. .................. | 235/492 |
| 2002/0014529 | A1 | 2/2002 | Tanaka .......................... | 235/449 |
| 2002/0161729 | A1 * | 10/2002 | Andrews ........................ | 705/417 |
| 2004/0108377 | A1 * | 6/2004 | Rietveld ........................ | 235/380 |
| 2005/0025117 | A1 * | 2/2005 | Inagaki et al. ................. | 370/350 |
| 2005/0077356 | A1 * | 4/2005 | Takayama et al. ............. | 235/451 |
| 2006/0056636 | A1 * | 3/2006 | Schrum ......................... | 380/273 |
| 2007/0145124 | A1 * | 6/2007 | Handa et al. .................. | 235/380 |
| 2007/0221725 | A1 * | 9/2007 | Kawaguchi .................... | 235/382 |
| 2007/0235537 | A1 * | 10/2007 | Yoneda et al. ................ | 235/435 |
| 2008/0128513 | A1 * | 6/2008 | Hammad et al. .............. | 235/492 |
| 2008/0219227 | A1 * | 9/2008 | Michaelis ...................... | 370/338 |

\* cited by examiner

*Primary Examiner* — Michael G Lee
*Assistant Examiner* — Tabitha Chedekel
(74) *Attorney, Agent, or Firm* — Schiff Hardin LLP

(57) ABSTRACT

A communication system including a reader application device having a reader application, and a reader configured to operate under control of the reader application to allow data to be transmitted between the reader application device and a user device via the reader.

14 Claims, 3 Drawing Sheets

READER APPLICATION DEVICE

BACKGROUND OF THE INVENTION

Various applications are executed using contact-based and contactless read and/or write devices, generically referred to as a reader, that communicate with user cards. These applications include banking applications, such as credit card processing, as well as identification applications, such as epassport. Each application requires a particular level of security against manipulation and attacks, ranging from no-security, such as in the case of near field communication applications, to a high security level, such as in the case of banking applications.

To perform high security applications, there must be a high level of resistance to attacks not only by the user card, but also by the reader.

An upgrade of reader security level is difficult, if not impossible, to achieve for at least two reasons. First, an upgrade often requires a hardware change. Also, the upgraded reader must be customized and certified; since this is often only possible in a secure environment, it is not feasible for existing readers to be upgraded in the field. The result is a manufacturer's choice between equipping the reader with a lower security level, risking the reader may not meet future higher level security requirements, and equipping the reader with the highest possible security level, risking the initial version of the reader being more expensive than necessary for applications requiring a lower level security.

BRIEF SUMMARY OF THE INVENTION

One aspect of the present invention provides a communication system including a reader application device having a reader application, and a reader configured to operate under control of the reader application to allow data to be transmitted between the reader application device and a user device via the reader.

DETAILED DESCRIPTION OF THE INVENTION

The present invention provides a communication system having a reader that communicates with a user card. A separate reader application card having a reader application can be connected to the contactless or contact-based reader. Under control of the reader application, the reader serves more or less as a data switch between the reader application card and the user card.

Figure 1A:
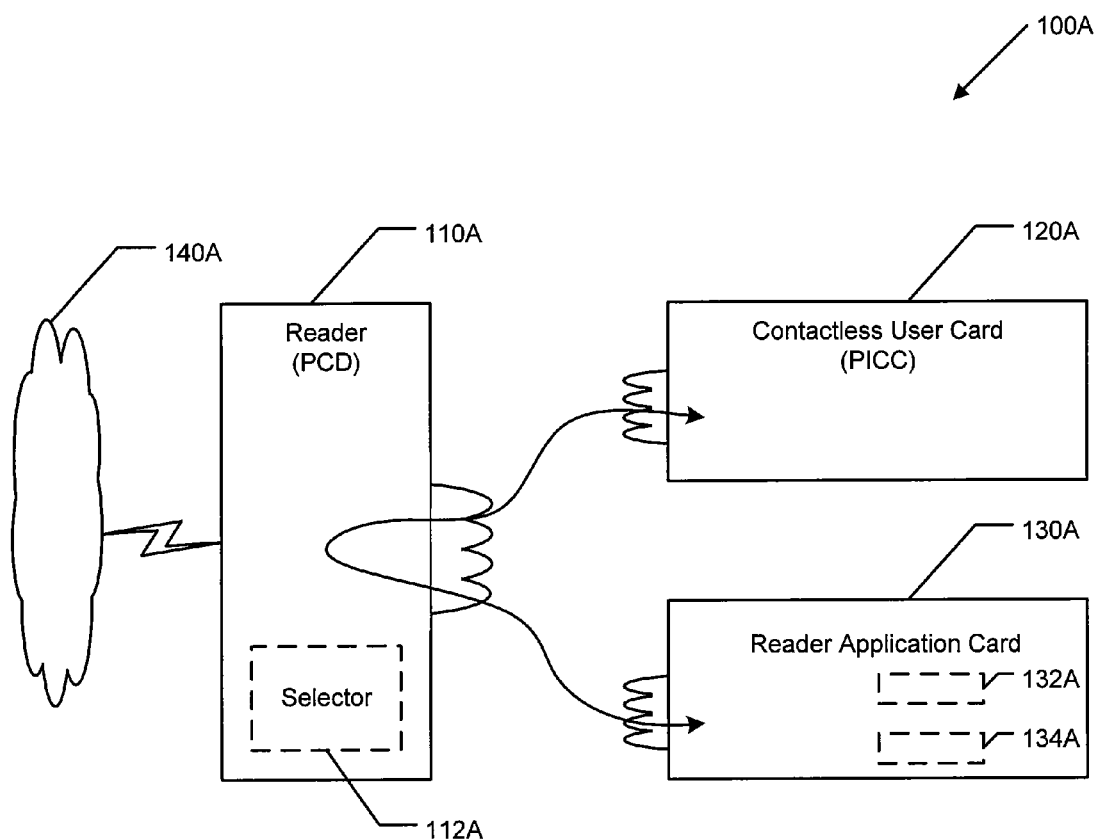
FIG. 1A is contactless communication system having a reader application card in accordance with an embodiment of the present invention.

FIG. 1A is a contactless communication system 100A in accordance with an embodiment of the present invention.

As shown in FIG. 1A, contactless card 120A, also known as a chip card, smart card, RFID tag, or proximity IC card (PICC), operates on the basis of communication by an electromagnetic field with a read and/or write interrogating device, generically referred to as a proximity coupled device (PCD) or reader 110A. The reader has a background system 140A for processing data read by or to be written by reader 110A.

Reader 110A typically transmits an electromagnetic carrier wave. This transmitted carrier wave serves on the one hand to power the contactless card 120A, which derives by induction the energy required for its operation, and on the other hand to initiate a communication between the card 120A and the reader 110A according to an established communication protocol. Communication protocols between contactless card 120A and reader 110A have been described, for example, in ISO standards 14443 A/B, 15693, and/or 18000.

Contactless communication system 100A additionally includes a reader application card 130A having a reader application. The reader application may be, for example, an epassport application, near field communication application, banking application, a security feature, any application based on high frequency (HF) communication, etc. Reader 110A and reader application card 130A communicate with each other in a manner similar to that in which reader 110A communicates with contactless card 120A, that is, using electromagnetic transmissions. The reader application card 130A may alternatively be self-powered.

When reader application card 130A comes within an interrogation field of reader 100A, reader 100A operates under control of the reader application, that is as a data switch or in a transparent mode, to allow data to be transmitted between reader application card 130 and user card 120A via reader 110A. Thus, the reader application in reader application card 130 does not merely provide access to user card 120A via reader 110A, the reader application controls reader 110A. Reader 100A may also operate under control of the reader application to allow data to be transmitted between reader application card 130, user card 120A, and the background system 140A of reader 110A via reader 110A.

The term "data" is not intended to be limiting. Data may include any form of commands and/or information.

Reader 110A may additionally have a selector 112A to select between a plurality of reader applications. The selection may be between an internal reader application of reader 110A and an external reader application stored in reader application card 130A. Alternatively, the selection may be between multiple reader applications stored on a same reader application card 130A or in more than one reader application card 130A. A more detailed explanation follows.

When a reader application card 130A is not within an interrogation field of reader 100A, reader 110A may operate according to an internal reader application which is generally installed during manufacture, though not necessarily. When reader application card 130A comes within an interrogation field of reader 100A, selector 112A may select between the reader's 110A internal reader application and a reader application stored in a nearby reader application card 130A. If selector 112A selects the reader application of the nearby reader application card 130A, reader 110A begins to operate in accordance with this external reader application. In other words, reader 110A operates as a data switch under control of the external reader application to allow data to be transmitted at least between reader application card 130A and contactless user card 120A via reader 110A.

Reader application card 130A is not limited to having a single reader application, but may alternatively have a plurality of reader applications. When a reader application card 130A having the plurality of reader applications comes within an interrogation field of reader 100A, selector 112A may select either between the reader's 110A internal reader application and one of the plurality of external reader applications stored in the nearby reader application card 130A, or may alternatively select between only the plurality of external reader applications. If selector 112A selects one of the external reader applications, reader 110A begins to operate under control of the selected external reader application to allow data to be transmitted between reader application card 130A and contactless user card 120A via reader 110A.

There may also be more than one reader application card 130A in the vicinity of reader 110A. In such a case, selector 112A selects between either between the reader's 110A internal reader application and one of the external reader applications stored in the nearby reader application cards 130A, or may alternatively select between only the external reader applications.

Alternatively, reader 110A may not have an internal reader application. In such a case, selector 112A selects only among any reader applications stored in any reader application cards 130A within the vicinity of reader 110A.

The selection of the reader application could be based at least in part on an application requirement of user card 120A. For example, if user card 120A is an automatic teller machine (ATM) card, selector 112A would select a reader application that is a banking application having high security, or possibly merely a high security application for reader 110A so that reader 110A can be used with a banking application provided by a background system 140A of reader 110A.

Reader application card 130A may have a display 132A and/or an input device 134A for displaying and/or inputting any kind of information, such as a login, password, application selection, etc. Display 132A and input device 134A may be any kind of known devices suitable for the intended purposes. Also, while display 132A and input device 134A are shown as separate components, they may be combined into a single device, such as a touch-screen display.

Reader application card 130A can provide a level of the security of reader 110A. If reader application card 130A includes a banking application, the level of security should be at a high level. If the reader application card includes a near field communication application, the level of security need only be at a low level. Some applications do not require any security. It is to be noted, however, that a particular application is not tied to a particular security level. For example, the near field communication application can have a high security level. The reader application card 130A of the present invention is advantageous in that reader 110A may be easily upgraded in the field, and without requiring any hardware change.

Communication system 100A is not limited to any particular form of contactless or electromagnetic communication and/or connection. The contactless connection between reader 110A and each of user card 120A and reader application card 130A may be based on, for example, radio waves, microwaves, terahertz radiation, infrared radiation, visible light, ultraviolet radiation, X-rays, gamma rays, Bluetooth, or any other form of contactless connection suitable for the intended purpose.

Figure 1B:
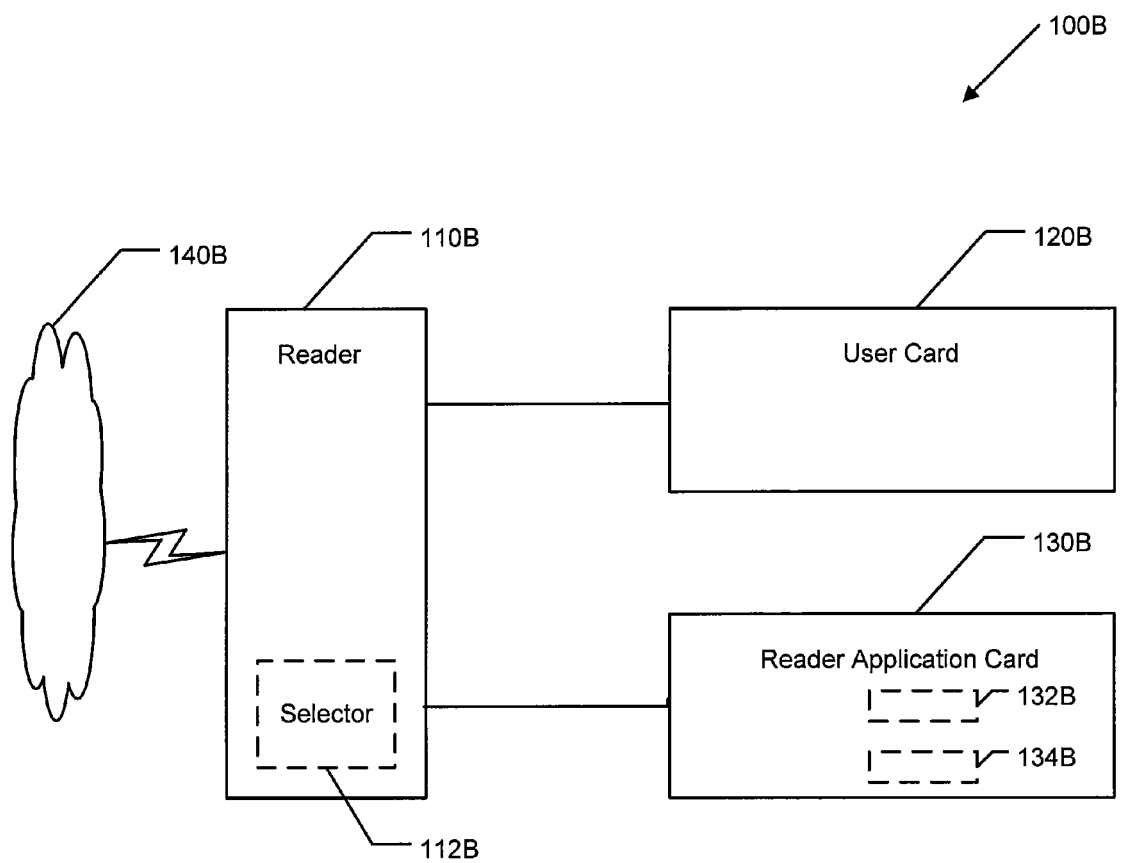
FIG. 1B is a contact-based communication system having a reader application card in accordance with another embodiment of the present invention.

FIG. 1B is a contact-based communication system 100B in accordance with another embodiment of the present invention.

Contact-based communication system 100B is similar to contactless communication system 100A described above, except that reader 110B, user card 120B, and reader application card 130B are coupled via a contact connection rather than a contactless connection. The contact connection may be, for example, a USB port, serial port, card drive, or any other contact connection suitable for the intended purpose.

Contact-based communication system 100B is otherwise similar to contactless communication system 100A. Since in light of the description of the contactless communication system 100A one of ordinary skill would appreciate how such a contact-based communication system 100B would function, for the sake of brevity, a description will not be provided here.

Further, reader 110 is not limited to communicating in only one of contactless and contact-based manners. Reader 110 may communicate with one of the user card 120 and reader application card 130 in a contactless manner and the other in a contact-based manner.

While the application has been described in terms of communication system 100 having user card 120 and reader application card 130, the application is not limited to these devices being in a form of a card. User card 120 may be any form of user device suitable for the intended purpose. Similarly, reader application card 130 may be any form of reader application device suitable for the intended purpose.

One possible application for this invention is to allow a laptop initially having low security to process credit card transactions requiring high security. More specifically, reader 110A may be located in a laptop having no security or a low level of security. When reader application card 130A comes within the vicinity of reader 110A, the laptop operates in accordance with a high security credit card application located within reader application card 130A.

Another possible application is upgrading a wireless communication device, such as a near field communication (NFC) enabled mobile phone or personal digital assistant, to a secure device. More specifically, the wireless communication device with no security is implemented in reader 110A. When reader application card 130A having a high security application comes within the vicinity of reader 110A having the wireless communication device, reader 110A operates transparently in accordance with the high security application to allow data to be transmitted between application card 130A, user card 120A, and a background system 140A of reader 110A via reader 110A. It should be noted that the background system 140A can be an integral operating system of reader 110A or a system running on an external computer or server.

Figure 2:
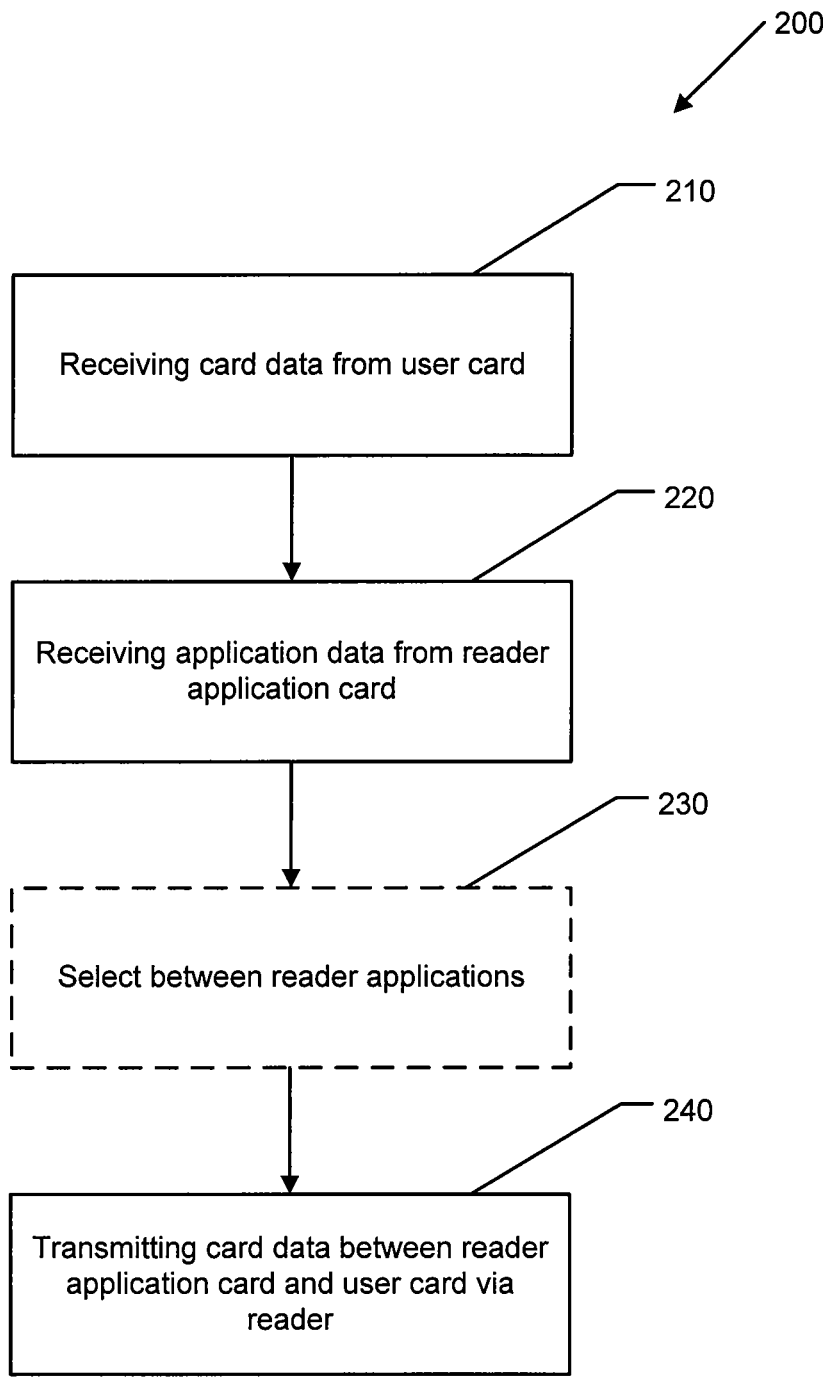
FIG. 2 is a communication method in accordance with an embodiment of the present invention.

FIG. 2 is a communication method in accordance with an embodiment of the present invention.

When user card 120 is connected to reader 100, either contactlessly or via a contact-based connection, reader 110 receives card data from user card 120. (Step 210.)

When reader application card 130 is connected to reader 100, either contactlessly or via a contact-based connection, reader 110 receives application data from reader application card 130. (Step 220.) This application data causes reader 110 to recognize reader application card 130.

Reader 110 then begins to operate in accordance with the selected reader application stored in reader application card 130, and allows data to be transmitted between reader application card 130 and user card 120 via reader 110. (Step 240.) The data may also be transmitted between reader application card 130, user card 120 and the background system 140 of the reader via reader 110. Again, "data" is not meant to be limiting, but may include any commands and/or information.

The invention is not limited to reader 110 receiving card data from user card 120 before receiving application data from reader application card 130. Reader 110 may receive card data from user card 120 after receiving application data from reader application card 130.

Optionally, selector 112 may select one of a plurality of external reader applications from one more reader application cards 130, or may select between an internal reader application and one more external reader applications, as described above. (Step 230.) This selection may be based on the received card data, as also described above.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A communication system, comprising:
   a portable reader controller device having a reader application;
   a single reader, without an internal contactless reader application; and
   a portable user device,
   wherein the reader is configured to operate under control of the reader application, when the portable reader controller device is coupled to the reader, to allow data to be transmitted between the reader controller device, the portable user device, and the reader to complete a transaction, wherein a security level of the data transmission is determined at least in part on the reader application.

2. The communication system of claim 1, wherein the user device is coupled with the reader.

3. The communication system of claim 1, wherein the portable reader controller device comprises a banking application.

4. The communication system of claim 1, wherein the portable reader controller device comprises a near field communication application.

5. The communication system of claim 1, wherein there is no security.

6. The communication system of claim 1, wherein the portable reader controller device comprises a display and/or input device.

7. The communication system of claim 1, wherein the reader is a wireless communication device.

8. The communication system of claim 7, wherein the wireless communication device is a cellular phone configured to communicate using near field communication.

9. The communication system of claim 1, further comprising a plurality of portable reader controller devices.

10. The communication system of claim 9, further comprising a selector configured to select a portable reader controller device of the plurality of portable reader controller devices based at least in part on an application requirement of the user device.

11. A portable reader controller device configured to provide a single reader, without an internal contactless reader application to control the reader, when the portable reader controller device is coupled to the reader, to allow data to be transmitted between the reader controller device, a portable user device, and the reader to complete a transaction, wherein a security level of the data transmission is determined at least in part on the reader application.

12. A single reader, without an internal contactless reader application, configured to communicate with a portable reader controller device that provides the reader with a reader application, when the portable reader controller device is coupled to the reader, to allow data to be transmitted between the portable reader controller device, a portable user device, and the reader to complete a transaction, wherein a security level of the data transmission is determined at least in part on the reader application.

13. The communication system of claim 12, wherein the portable reader controller device is coupled with the reader contactlessly.

14. A communication method, comprising:
   receiving first data from a portable user device;
   receiving second data from a portable reader controller device having a reader application; and
   transmitting the first data between the portable reader controller device, the portable user device, and a singe reader without an internal contactless reader application, under control of the reader application, when the portable reader controller device is coupled to the reader, to complete a transaction, wherein a security level of the data transmission is determined at least in part on the reader application.

* * * * *